Patented Aug. 17, 1943

2,327,333

UNITED STATES PATENT OFFICE 2,327,333

DRYING PROCESS

Edward C. Kirkpatrick, Wilmington, Del., assignor to E. I. du Pont de Nemours & Company, Wilmington, Del., a corporation of Delaware No Drawing. Application June 20, 1941,
Serial No. 398,917

5 Claims. (Cl. 260—555)

This invention relates to the preparation of pure crystal urea and more particularly to a method of drying moist, crystal urea.

In ordinary industrial practice, urea is produced synthetically from ammonia and carbon dioxide and the final urea crystals are obtained in moist condition, wet with the mother liquor from which the crystals have been removed. Impurities which exist in or on the crystal urea are largely present in the mother liquor and consist primarily of by-products of the synthesis such as ammonium carbonate and carbamate, free ammonia, and the essentially thermal decomposition products, cyanuric acid and biuret.

The presence of these impurities is undesirable in many industrial applications of crystal urea such, principally, as in the preparation of urea-formaldehyde resins. In such applications of crystalline urea, the ammonium salts which are present as impurities react with formaldehyde to yield undesirable byproducts such as hexamethylenetetramine, causing an increase in the amount of formaldehyde required and upsetting the balance in the urea to formaldehyde ratio. Furthermore, during synthesis of the resin, the pH of crystalline urea must be maintained uniformly at a given figure in order that the product may be satisfactory. Since ammonium salts slowly decompose during storage, their presence even in small quantities causes the pH of urea crystals to shift over a considerable range. Inasmuch as a constant pH is an important criterion of the suitability of a urea product for use in the manufacture of good quality urea-formaldehyde resins, the presence of ammonium salts as impurities in the urea is a problem of considerable magnitude.

It is an object of this invention to overcome the disadvantages of the prior art and to provide a process for the production of crystalline urea which is free from impurities. It is a further object of this invention to provide a process for the production of crystalline urea which is substantially free from ammonium salts. Other objects and advantages of the invention will be apparent from the following specification.

I have discovered that the impurities, such as ammonium carbamate, ammonium carbonate and free ammonia, ordinarily present in crystalline urea such, for example, as that synthetically produced from ammonia and carbon dioxide, may be removed by concurrently passing the moist urea and heated air through a drying area.

Although I shall not be limited by the explanation, I believe that by means of my discovery I am enabled to take advantage of the fact that the conversion of ammonium carbamate to ammonium carbonate, by way of hydrolysis, is slow at room temperature and sufficiently rapid to be completed during a drying period only when the temperature exceeds 176° F. I believe that ammonium carbamate cannot be thermally decomposed directly to $NH_3$ and $CO_2$ but must first be hydrolyzed to ammonium carbonate. In order to produce urea free of ammonium salts, it is therefore necessary to use a drying technique which will cause the crystals of urea to reach a temperature above 176° F., while the crystal mass still contains appreciable amounts of moisture. I have found that the use of parallel or co-current flow in the air drying of urea crystals will permit drying at such an elevated temperature, and in the presence of moisture, as to give dry crystals which contain no ammonium salts as impurities, and without extensive thermal decomposition or hydrolysis of the urea to such well-recognized products as cyanuric acid, biuret and ammonium carbamate, especially under conditions where the urea is stabilized as later described.

It is common industrial practice to dry materials countercurrently, i. e. with the material to be dried passing in the opposite direction to that of the gas or material by which the drying is being accomplished. With countercurrent flow of urea and air in urea drying, the moist urea meets the colder exit air and the crystals are therefore dried while comparatively cool. Accordingly, a large rise in temperature of the substantially dry crystals occurs near the crystal exit end of the drier and the crystal exit temperatures may exceed the air exit temperatures.

When operating according to this invention, however, with air and urea crystals flowing through the drier co-currently, the heated inlet gases rapidly transfer their heat to the entering moist solid crystals and drying occurs under conditions where carbamate is rapidly hydrolyzed to carbonate and the carbonate decomposed and volatilized to ammonia and carbon dioxide.

The melting point of urea is 271° F. This limits the temperature to which the dry crystals may be heated. Under conditions of countercurrent flow, the hot air meets the hot dry crystals and if the air inlet temperature exceeds 271° F. caking of urea occurs. On the other hand, in cocurrent drier operation the air inlet temperature may be considerably higher than the melting point of urea since the hot air meets cool, wet crystals which are able to withstand a considerable thermal load because of the latent heat of vaporization of H₂O. I have found that the inlet air temperature may range upwards to 500° F. and above, depending upon the degree of moisture in the urea, although normally I prefer to operate with lower inlet air temperatures of the order of 270 to 400° F.

In cocurrent flow the maximum crystal temperature, that of the dried product, is determined by a heat balance involving the quantity of the inlet air and its temperature and the temperature, quantity and moisture content of the inlet crystals. This maximum crystal temperature is therefore controllable, at least in part, by factors other than the temperature of the inlet air. The heat that is supplied to a drier is determined by the temperature and quantity of the inlet air. Since the air flow rate for both types of flow is limited by the dusting characteristics of the drier, and because of the higher safe temperature of operation and therefore the greater allowable heat input with cocurrent flow, it is possible to offset the lower heat transfer efficiency of cocurrent drying. The capacity of a urea drier may therefore be actually increased by a shift from countercurrent to cocurrent operation.

In copending application U. S. Ser. No. 371,391, it has been shown that urea itself may be stabilized against decomposition, hydrolysis and isomerization by addition thereto of small quantities of purine ring compounds such as caffeine. In the practice of this invention advantage may also be taken of this discovery and small quantities, say from 0.0001 to 1.0% based upon the weight of the urea, of purine ring compounds may be added to the urea before drying.

The following example will illustrate how the invention may be practiced:

EXAMPLE 1

To a urea-water slurry obtained from a commercial urea synthesis plant was added 10 parts per million of caffeine. The mixture was centrifuged at 50° C. and the wet centrifuged crystals were dried in a 40" x 8" ID stainless steel rotary drier. The results of such drying experiments with cocurrent and countercurrent flow are shown in Table I. The contact time in the drier and the initial and final water contents of the crystals were the same in all runs.

TABLE I

*Air drying of crystal urea*

| Run | Flow | Drying conditions, temperatures °F. | | |
|---|---|---|---|---|
| | | Air into drier | Air from drier | Crystals out of drier |
| 180 | Cocurrent | 270 | 203 | 176 |
| 181 | Countercurrent | 198 | 168 | 190 |

*Product analysis*

| Run | Days in storage | pH | Combined NH₃, p. p. m. |
|---|---|---|---|
| 180 | 0 | 8.33 | |
| | 3 | 8.61 | |
| | 7 | 8.59 | 0.0 |
| | 27 | 8.56 | |
| 181 | 0 | 8.30 | |
| | 3 | 8.96 | |
| | 8 | 9.29 | 7.6 |
| | 24 | 8.71 | |

It will be noted that cocurrent drying of caffeine stabilized urea produces a material free of ammonium salts and of low and stable pH. All analyses show the product of countercurrent drying to be of inferior quality.

EXAMPLE 2

The following series of tests illustrate the conditions required for removal of ammonium salts during drying. Dry commercial urea was reheated (run 171) in the stainless steel drier described in Example 1. This treatment did not alter the pH, alkalinity or buffer action. When a second sample of commercial urea was redried countercurrently after the addition of moisture (run 172) there was but a slight reduction in pH and alkalinity. Moist urea was then redried cocurrently (run 176). Despite a shorter contact time this treatment resulted in a marked improvement in product quality. These results therefore show that urea can be freed of ammonium salts only when the material is dried cocurrently in the presence of moisture.

TABLE II

*Air drying of crystal urea*

| Run | Feed | Flow | Temperature °F. | | | |
|---|---|---|---|---|---|---|
| | | | Air | | Crystals | |
| | | | Into drier | From drier | Into drier | From drier |
| 171 | Crystal urea | Countercurrent | 204 | 171 | 72 | 196 |
| 172 | Urea+2½% H₂O | do | 205 | 159 | 124 | 186 |
| 176 | do | Cocurrent | 280 | 233 | 126 | 171 |

*Product analysis*

| Run | Contact time, min. | pH | Alkalinity (cc.) | Buffer strength (cc.) |
|---|---|---|---|---|
| 171 | 9.9 | 9.40 | 0.85 | 1.68 |
| 172 | 7.8 | 9.18 | 0.55 | 1.66 |
| 176 | 6.4 | 8.53 | 0.10 | 0.85 |

The alkalinity is defined as the cubic centimeters of 0.01 normal HCl required to reduce to 8.0 the pH of a 10% aqueous solution of 10 grams of urea. The buffer strength is similarly defined as the cubic centimeters of 0.01 normal HCl required to reduce the pH of this urea solution from 8.0 to 6.0. The addition of pure urea is without effect on the hydrogen ion concentration of water. The pH, alkalinity and buffer value of urea solutions are therefore caused by the presence of ammonium salts.

I claim:

1. In removing impurities from crystalline urea, the step which comprises cocurrently passing moist crystalline urea and air through a drier, the temperature of the air entering the drier being such that the crystalline urea reaches a temperature of at least 176° F., but below 271° F., before leaving the drier.

2. In removing impurities from crystalline urea, synthesized from ammonia and carbon dioxide, the step which comprises cocurrently passing moist crystalline urea and air through a drier, the temperature of the air entering the drier being such that the crystalline urea reaches a temperature of at least 176° F. before leaving the drier.

3. In removing impurities from crystalline urea, synthesized from ammonia and carbon dioxide, the step which comprises cocurrently passing moist crystalline urea and air through a drier, the temperature of the air entering the drier being such that the crystalline urea reaches a temperature of at least 176° F., but below 271° F., before leaving the drier.

4. In removing hydrolyzable and volatile impurities from crystalline urea, the step which comprises cocurrently passing moist crystalline urea and super-heated air through a drier, the temperature of the air entering the drier being above 271° F., the melting point of pure urea, and below 500° F.

5. In removing hydrolyzable and volatile impurities from crystalline urea, the step which comprises cocurrently passing wet crystalline urea and superheated air through a drier, the temperature of the air entering the drier being such that the wet crystalline urea, while still moist, reaches a temperature of at least 176° F. but below 271° F.

EDWARD C. KIRKPATRICK.